Sept. 28, 1937.   C. GIRL   2,094,401
DECK LOADER AND UNLOADER
Filed April 10, 1936   2 Sheets-Sheet 1

INVENTOR
CHRISTIAN GIRL
BY *Whittemore Hulbert*
*Whittemore Belknap*
ATTORNEYS

Sept. 28, 1937.  C. GIRL  2,094,401
DECK LOADER AND UNLOADER
Filed April 10, 1936  2 Sheets-Sheet 2
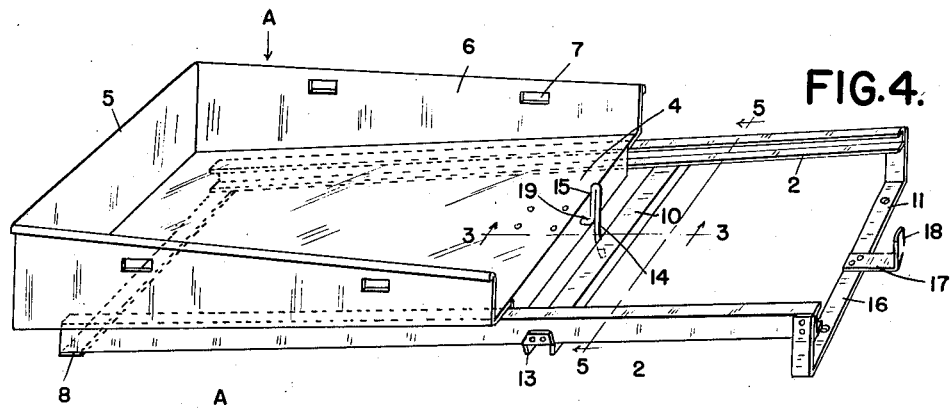
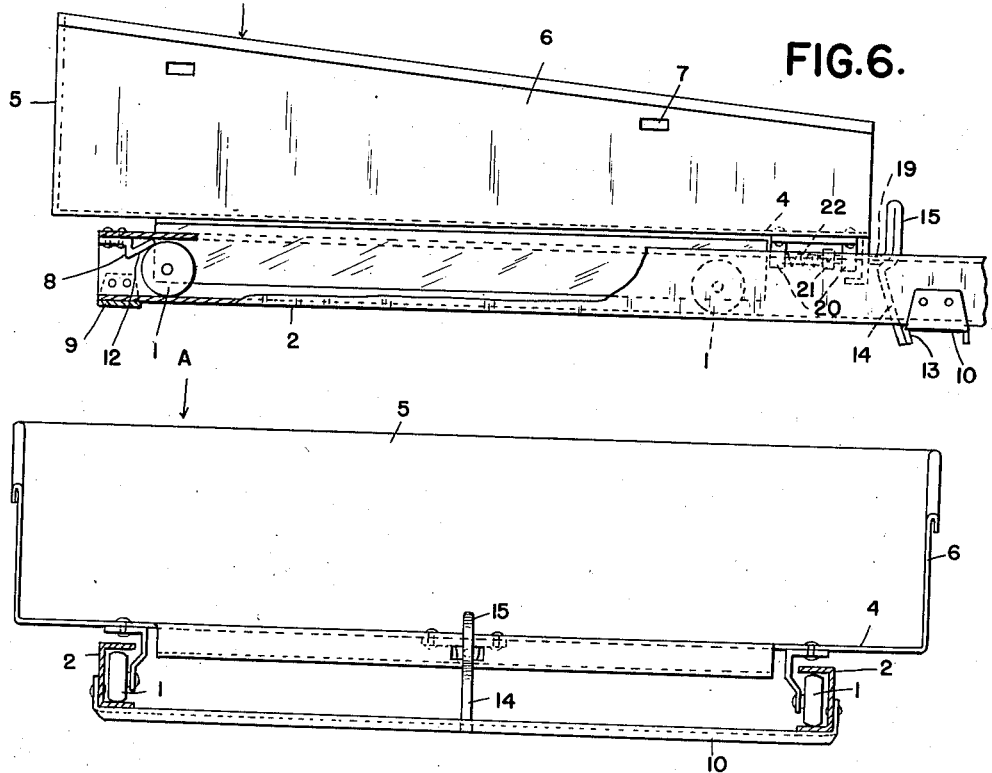
INVENTOR
CHRISTIAN GIRL
BY *Whittemore Hulbert*
*Whittemore Belknap*
ATTORNEYS Patented Sept. 28, 1937

2,094,401

UNITED STATES PATENT OFFICE 2,094,401

DECK LOADER AND UNLOADER

Christian Girl, Detroit, Mich., assignor to Kelch Heater Company, Detroit, Mich., a corporation of Michigan Application April 10, 1936, Serial No. 73,739

16 Claims. (Cl. 214—65)

This invention relates generally to loading and unloading devices for vehicles and refers more particularly to a device for loading and unloading from an accessible point of a vehicle the relatively inaccessible portions thereof.

One of the essential objects of the invention is to provide a device of this character that may be readily applied as an attachment to a truck or to the rear deck or storage compartment of a coupé.

Another object of the invention is to provide a device of this character wherein means is provided for holding against movement and rattling the article carrier when it is in a predetermined position in said compartment, for example, in its forward position within a relatively inaccessible forward end of the storage compartment of the coupé when the latter is in transit.

Another object is to provide a device wherein such means operates automatically when the carrier reaches such predetermined position to hold the carrier as aforesaid, and may be conveniently and easily released by hand whenever desired.

Another object is to provide a device wherein a portion of such means is utilized when the carrier is in another predetermined position to hold the carrier against movement, for instance, in its rearward position at the accessible end of the storage compartment of the coupé while being loaded or unloaded.

Other objects, advantages and novel details of construction of this invention will be made more apparent as this description proceeds, especially when considered in connection with the accompanying drawings, wherein:

Figure 4 is a perspective view of the loading and unloading device;

Figure 5 is a sectional view taken substantially on the line 5—5 of Figure 4;

Figure 6 is a fragmentary side elevation, with parts broken away and in section, of the structure illustrated in Figure 4.

Figure 1:
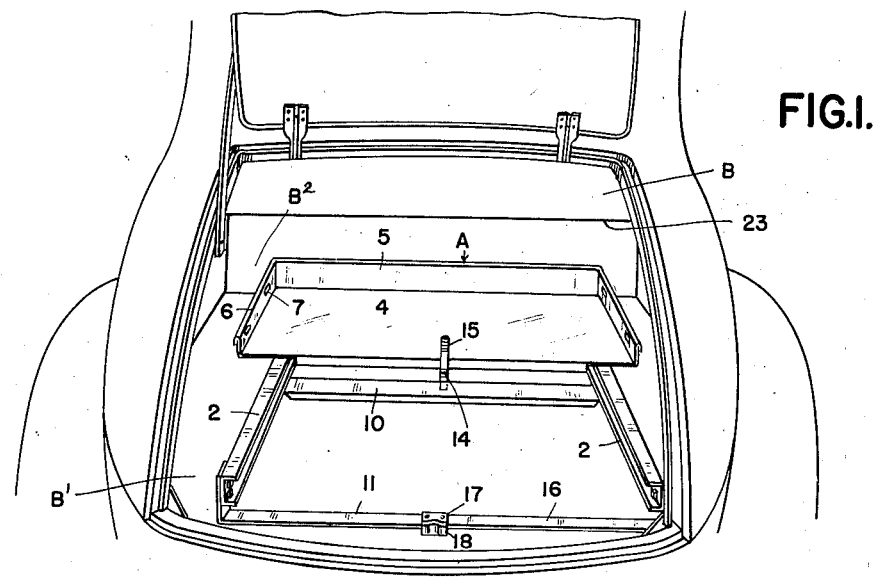
Figure 1 is a fragmentary perspective view of a coupé showing a loading and unloading device embodying my invention within the rear storage compartment thereof and with the article carrying tray of the device at the inaccessible forward end of the storage compartment.

Referring now to the drawings, A is an article carrier within a rear deck or storage compartment B of a coupé and movable lengthwise of said compartment from the rear accessible end $B^1$ to the forward inaccessible end $B^2$ thereof. As shown, such carrier is in the form of a tray and is provided with casters or rollers 1 which travel in inwardly opening channels 2 within the rear deck or storage compartment B. Preferably the carrier A is in the form of a tray having a substantially flat bottom 4, and upright front and side walls 5 and 6, respectively. Any suitable means such as straps (not shown) may be engaged with openings 7 in the sides of the tray for retaining articles within the tray. Likewise any suitable material such as sheet metal may be used in the construction of said tray. In the present instance, however, the casters 1 are formed of rubber or rubber composition for purposes to be hereinafter more fully set forth.

At the forward ends of the channels 2 are rigid stops or abutments 8 for the forward casters 1, while at spaced points longitudinally of the channels 2 in rear of said stops are suitable cross bars 9, 10 and 11, respectively. Preferably the rear faces 12 of the stops 8 incline downwardly and forwardly as shown for engagement by the forward casters 1 of the carrier, while a depending flange 13 at the forward edge of the cross bar 10 is downwardly and rearwardly inclined as shown so as to form in effect a cam element for engagement by a correspondingly inclined depending extension 14 of a spring pressed upstanding handle 15 carried by the bottom 4 of the carrier at the rear end thereof. The rear cross bar 11 is substantially U-shaped. The base 16 of the U is spaced below the channels 2 and carries a rearwardly projecting bracket 17 provided at its rear end with a transversely curved upstanding portion 18 for engagement also by the extension 14 of the handle 15.

Preferably the handle 15 has a forwardly projecting substantially horizontal shank 19 and rotatably mounted in spaced brackets 20 rigid with the bottom 4 of the tray, and is provided between said brackets with a collar 21 and a coil tension spring 22. As shown, this spring 22 is sleeved on the shank 19 between the forward bracket 20 and the collar 21 and urges the latter toward the rear bracket 20. The collar 21 is preferably fixed to the shank 19, consequently pressure by the spring 22 rearwardly against said collar 21 will cause the shank 19, handle 15 and extension 14 to be moved as a unit rearwardly relative to the carrier A until the collar 21 abuts the rear bracket 20.

Figure 2:
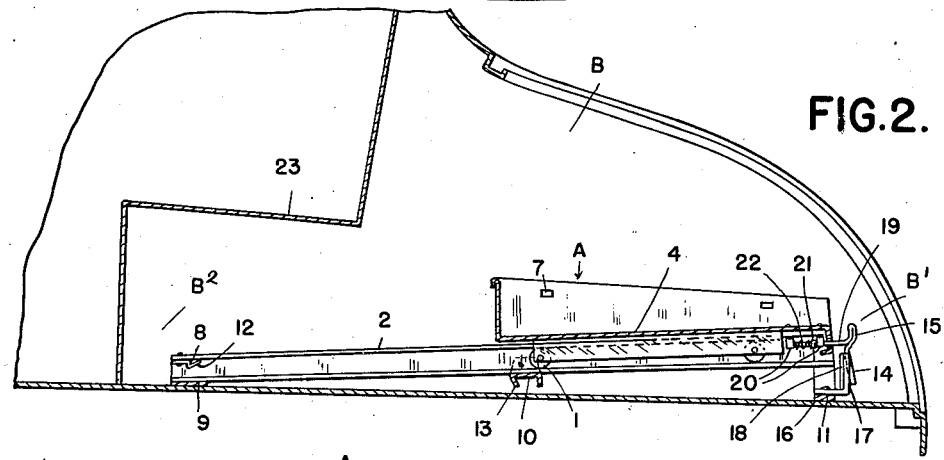
Figure 2 is a fragmentary longitudinal vertical sectional view through the coupé and showing the article carrying tray at the accessible rear end of the storage compartment.
Figure 3:
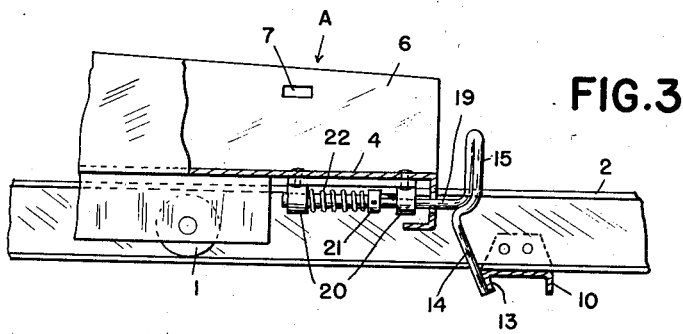
Figure 3 is a fragmentary vertical sectional view taken substantially on the line 3—3 of Figure 4.

In use, the carrier A is normally in its forward position at the inaccessible end of the storage compartment of the coupé, as illustrated in Figure 1. When it is desired to load or unload the coupé compartment B, the handle 15 is turned by the operator from the vertical position shown to a horizontal position so as to disengage the extension 14 from the flange 13 of the cross bar 10. The carrier A is then pulled rearwardly by hand to the accessible end of the storage compartment as illustrated in Figure 2, whereupon the extension 14 is manipulated by the handle 15 into engagement with the upstanding portion 18 of the bracket 17 to hold the carrier against forward movement.

After the carrier A has been loaded or unloaded as desired while in its rearward position, the extension 14 may be released from the bracket 17 so that the carrier may be pushed forwardly to the position illustrated in Figure 1. Upon reaching such forward position, the forward casters 1 will abut the stops 8, and the extension 14 will automatically snap into engagement with the flange 13 and effectively hold the casters 1 against said stops. Inasmuch as the casters 1 are formed of resilient material and the rear faces 12 of the stops as well as the flange 13 are inclined, it is apparent that the carrier A will be forced forwardly and downwardly upon engagement of the extension 14 with the flange 13. As a result, all four of the casters 1 will be compressed slightly against the channel members 2 and the carrier A will accordingly be drawn down and held firmly against movement and rattling.

Thus, from the foregoing, it will be apparent that I have provided a very efficient and practical carrier which may be easily and conveniently loaded or unloaded without climbing upon a rear bumper or other part of the vehicle. In other words, the carrier may be readily manipulated and loaded and unloaded by one person from either side of the coupé while such person is standing on the ground. After the carrier has been loaded in its rearward position, it may be moved forwardly under the seat 23 of the coupé so that the space in the compartment at the rear of the carrier may be loaded. When unloading, the articles are removed first from the space within the compartment at the rear of the carrier and then the carrier is moved rearwardly and unloaded.

It is also to be understood that the runway structure may be mounted crosswise instead of lengthwise of a vehicle so that articles may be loaded or unloaded from one side or the other of such vehicle.

What I claim as my invention is:

1. A loading and unloading device for a rear compartment of a coupé, said compartment having a relatively inaccessible forward end, comprising an article carrier movable lengthwise of the compartment from substantially one end to the other thereof and provided at opposite ends thereof with supporting casters, the casters at the forward end of said carrier being resilient, a track for said casters, means at the inaccessible forward end of the compartment cooperating with the track for compressing the resilient casters, an abutment adjacent the accessible end of the compartment, and means associated with the carrier and engageable with said abutment to cause the resilient casters aforesaid of the carrier to be compressed as aforesaid.

2. A loading and unloading device for a rear compartment of a coupé, said compartment having a relatively inaccessible forward end, comprising an article carrier movable lengthwise of the compartment from substantially one end to the other thereof and provided at opposite ends thereof with supporting casters, a track for said casters within said compartment, means carried by the track at the inaccessible forward end of the compartment for camming the forward casters of the carrier against the track, an abutment carried by the track adjacent the accessible end of the compartment, and means associated with the carrier and engageable with the last mentioned abutment for causing the forward casters of the carrier to be cammed as aforesaid.

3. A loading and unloading device for a rear compartment of a coupé, said compartment having a relatively inaccessible forward end, comprising an article carrier movable lengthwise of the compartment from substantially one end to the other thereof and provided at opposite ends thereof with supporting casters, a track for said casters, means at the inaccessible forward end of the compartment for camming the forward casters of the carrier against the track, a cross bar connected to said track adjacent the accessible end of the compartment, and means associated with the carrier and engageable with said cross bar for causing the forward casters of said carrier to be cammed as aforesaid.

4. A loading and unloading device for a rear compartment of a coupé, said compartment having a relatively inaccessible forward end, comprising an article carrier movable lengthwise of the compartment from substantially one end to the other thereof and provided at opposite ends thereof with supporting casters, a track for said casters, means at the inaccessible forward end of the compartment for camming the forward casters of the carrier against the track, a member connected to the track adjacent the accessible rear end of the compartment, and means for causing the forward casters of the carrier to be compressed as aforesaid when the carrier is moved to the inaccessible forward end of the compartment, including an element carried by the carrier and engageable with the member aforesaid.

5. A loading and unloading device for a rear compartment of a coupé, said compartment having a relatively inaccessible forward end, comprising an article carrier movable lengthwise of the compartment from substantially one end to the other thereof and provided at opposite ends thereof with supporting casters, a track for said casters, abutments for the casters at the forward end of said carrier at the inaccessible forward end of the compartment, an abutment adjacent the accessible end of the compartment, the first and last mentioned abutments having inclined faces, and means for holding the forward casters of the carrier against the first mentioned abutments when the carrier is moved to the inaccessible forward end of the compartment, including a spring pressed handle carried by the carrier and having an extension engageable with the last mentioned abutment, the construction of said caster and extension being such that upon engagement of said casters and extension respectively with said inclined faces, the casters will be compressed slightly and the carrier will be held down firmly against movement and rattling on the track.

6. A vehicle loading and unloading device comprising an article carrier, a pair of laterally spaced runways for said article carrier, casters connected to said carrier at the forward and rear ends thereof and movable along said runways, and means operable when the carrier reaches a predetermined point of said runways for holding the carrier against movement, including cam means engageable by the forward casters, and cooperating cam elements connected to the carrier and runways respectively and engageable with each other when the cam means aforesaid is engaged by the forward casters.

7. A loading and unloading device for a rear compartment of a coupé, said compartment having a relatively inaccessible forward end, comprising an article carrier movable lengthwise of the compartment from substantially one end to the other thereof, a track for said article carrier, casters connected to said carrier at the forward and rear ends thereof and movable along said track, and means operable when the carrier reaches a predetermined point of said track for holding said carrier against movement, including cam means engageable by the forward casters, and cooperating cam elements connected to the carrier and track respectively and engageable with each other when the cam means aforesaid is engaged by the forward casters.

8. In a loading and unloading device of the class described, an article carrier, runways for said article carrier, rollers connected to said article carrier fore and aft thereof and movable along said runways, the forward rollers of the carrier being compressible, means cooperating with the runways to compress the forward rollers when the carrier is in a predetermined position, a cross bar carried by said runways in spaced relation to said means, and means operable when the said carrier is in said predetermined position for holding said carrier against movement and rattling, including means on the carrier engageable with said cross bar to cause the forward rollers of the carrier to be compressed as aforesaid.

9. In a loading and unloading device of the class described, an article carrier, runways for said article carrier, rollers connected to said article carrier fore and aft thereof and movable along said runways, the forward rollers of the carrier being compressible, means cooperating with the runways to compress the forward rollers when the carrier is in a predetermined position, an abutment in spaced relation to said means, and means operable when said carrier reaches said predetermined position for holding said carrier against movement and rattling, including a spring-actuated member carried by the carrier and engageable with said abutment, the engagement between said member and abutment being such as to cause the forward rollers of the carrier to be compressed as aforesaid.

10. In a device of the class described, an article carrier, runways for said carrier, compressible casters connected to said article carrier at the forward and rear ends thereof and movable along said runways, and means operable when said carrier is in a predetermined position on said runways for holding said carrier against movement including means for compressing said forward and rear casters.

11. In a device of the class described, an article carrier, runways for said carrier, casters connected to said article carrier at the forward and rear ends thereof and movable along said runways, stops on said runways for the casters and having downwardly and forwardly inclined rear faces, a member connected to said runways in spaced relation to said stops and having a downwardly and rearwardly inclined face, and means operable when the forward rollers engage the inclined rear faces of said stops to hold the carrier against movement including means connected to the carrier and engageable with the inclined face of said member.

12. In a device of the class described, an article carrier, runways for said carrier, casters connected to said article carrier at the forward and rear ends thereof and movable along said runways, stops on said runways for the forward casters, a member connected to said stops, and means operable when the forward rollers engage said stops to hold said forward rollers in engagement with said stops including spring pressed means slidably and rotatably mounted on the carrier and having a projection engageable with said member.

13. In a device of the class described, an article carrier, runways for said carrier, rollers connected to said carrier at the forward and rear ends thereof and movable along said runways, the forward rollers being compressible, means cooperating with said runways to compress the forward rollers when the carrier is in a predetermined position, and means operable when the carrier is in said predetermined position for holding said carrier against movement including a cam element connected to said runways, and means connected to the carrier and engageable with said cam element to cause the forward rollers of the carrier to be compressed as aforesaid.

14. In a device of the class described, an article carrier, runways for said carrier, rollers connected to said carrier at the forward and rear ends thereof and movable along said runways, stops on said runways for the forward rollers of said carriers, an abutment connected to said runways in spaced relation to said stops, and means operable when the forward rollers engage said stops for holding said forward rollers against said stops, including a spring pressed member rotatably and slidably mounted on the carrier and having an extension at substantially right angles to the axis of rotation of said member engageable with said abutment.

15. In a device of the class described, an article carrier, runways for said carrier, casters connected to said carrier at the forward and rear ends thereof and movable along said runways, stops on said runways for the forward casters, an abutment connected to said runways in spaced relation to said stops, spaced brackets fixed to said carrier, and means operable when the forward casters engage said stops for holding said carrier against movement, including a manually operable handle having a shank mounted for rotary and sliding movements in said spaced brackets and having an extension engageable with said abutment, a collar on the shank between the spaced brackets, and a coil spring sleeved on the shank between the collar and one of said brackets.

16. In a device of the class described, an article carrier, downwardly and forwardly inclined runways for said carrier, casters connected to said carrier at the forward and rear ends thereof and movable along said runways, stops on said runways at the lower forward end thereof for the forward casters, abutments connected to said runways at spaced points longitudinally thereof adjacent the rear elevated end thereof, and a handle connected to said carrier and having an extension engageable with one of said abutments to hold the forward casters against said stops when the carrier is at the lower forward end of the runways, said extension being engageable with the other of said abutments to hold the carrier at the elevated end of said runways in spaced relation to said stops.

CHRISTIAN GIRL.